United States Patent
Ye et al.

(10) Patent No.: US 12,459,835 B2
(45) Date of Patent: Nov. 4, 2025

(54) FLUIDIZED ADSORPTION DEVICE AND FLUIDIZED ADSORPTION METHOD FOR SEWAGE TREATMENT

(71) Applicants: INSTITUTE OF URBAN ENVIRONMENT, CHINESE ACADEMY OF SCIENCES, Xiamen (CN); XIAMEN INSTITUTE OF RARE EARTH MATERIALS, Xiamen (CN)

(72) Inventors: Xin Ye, Xiamen (CN); Shaohua Chen, Xiamen (CN); Minquan Chen, Xiamen (CN); Jinglin Chen, Xiamen (CN); Wei Wang, Xiamen (CN); Xiaofeng Xu, Xiamen (CN); Jie Yang, Xiamen (CN); Yougui Huang, Xiamen (CN)

(73) Assignees: INSTITUTE OF URBAN ENVIRONMENT, CHINESE ACADEMY OF SCIENCES, Xiamen (CN); XIAMEN INSTITUTE OF RARE EARTH MATERIALS, Xiamen (CN)

( * ) Notice: Subject to any disclaimer, the term of this patent is extended or adjusted under 35 U.S.C. 154(b) by 702 days.

(21) Appl. No.: 17/702,876

(22) Filed: Mar. 24, 2022

(65) Prior Publication Data
US 2022/0242751 A1 Aug. 4, 2022

Related U.S. Application Data (63) Continuation of application No. PCT/CN2021/116638, filed on Sep. 6, 2021.

(30) Foreign Application Priority Data

Feb. 1, 2021 (CN) .......................... 202110140383.2

(51) Int. Cl.
| | | |
|---|---|---|
| C02F 1/28 | (2023.01) | |
| B01D 53/18 | (2006.01) | |
| C02F 1/40 | (2023.01) | |
| C02F 103/00 | (2006.01) | |
| C02F 103/34 | (2006.01) | |

(52) U.S. Cl.
CPC ............... *C02F 1/28* (2013.01); *B01D 53/18* (2013.01); *C02F 1/40* (2013.01); *C02F 2103/005* (2013.01); *C02F 2103/34* (2013.01); *C02F 2201/002* (2013.01); *C02F 2301/04* (2013.01)

(58) Field of Classification Search
CPC . B01D 53/18; C02F 1/001; C02F 1/28; C02F 1/40; C02F 2101/105; C02F 2101/14; C02F 2103/005; C02F 2103/34; C02F 2201/002; C02F 2301/04
See application file for complete search history.

(56) References Cited

U.S. PATENT DOCUMENTS

| | | | | |
|---|---|---|---|---|
| 2,889,270 | A  * | 6/1959 | Marshall ................... | B01J 8/44 208/158 |
| 2006/0037295 | A1 * | 2/2006 | Gubler ................... | B01D 46/02 55/478 |
| 2011/0127019 | A1 * | 6/2011 | Abastari .................. | F24F 1/38 415/219.1 |
| 2017/0291196 | A1 * | 10/2017 | Ridinger ............... | B01D 29/68 |

FOREIGN PATENT DOCUMENTS

| | | | | |
|---|---|---|---|---|
| CN | 105330058 A | * | 2/2016 | ................ C02F 9/00 |

OTHER PUBLICATIONS

Guan et al. "Simulation and analysis of dual-reflux pressure swing adsorption using silica gel for blue coal gas initial separation" (Year: 2020).*

* cited by examiner

*Primary Examiner* — Krishnan S Menon
*Assistant Examiner* — Tak L Chiu
(74) *Attorney, Agent, or Firm* — Hawaii Patent Services; Nathaniel K. Fedde; Kenton N. Fedde (57) ABSTRACT

The application relates to a fluidized adsorption device and a fluidized adsorption method for sewage treatment. The fluidized adsorption device comprises a fluidized adsorption column and a reflux device, wherein the fluidized adsorption column is consisted of a water outlet area, a fluidized adsorption area and a water inlet area from top to bottom; the reflux device includes top, middle and bottom reflux ports, and related reflux tubes; and the top reflux port and the bottom reflux port are activated during adsorption, and the middle reflux port and the bottom reflux port are activated during adsorbent replacement, such that the fluidized adsorption column can run continuously.

7 Claims, 2 Drawing Sheets

FLUIDIZED ADSORPTION DEVICE AND FLUIDIZED ADSORPTION METHOD FOR SEWAGE TREATMENT

BACKGROUND OF THE INVENTION

1. Field of the Invention

The invention belongs to the technical field of sewage treatment, and particularly relates to a fluidized adsorption device and a fluidized adsorption method for sewage treatment.

2. Description of Related Art

With the acceleration of urbanization and the improvement of people's living standards, the output of domestic sewage and industrial wastewater is increasing. In order to create a green and healthy environment, the discharge standard of sewage is becoming increasingly strict. Among many sewage treatment methods, adsorption method is a common and mature technical way, which is mainly used to remove trace pollutants, including decolorization, deodorization, removal of heavy metals, dissolved organic matter, radioactive elements, etc. The adsorption method has the advantages of high pollutant removal efficiency and simple operation, and can be used as a pretreatment method of ion exchange, membrane separation and other methods, as well as an advanced treatment means after secondary treatment to ensure the quality of reused water.

At present, in the sewage treatment technology, the fixed-bed reactor is the most commonly used adsorption equipment in sewage treatment, and the flow of fluid in the bed is close to the plug flow. Compared with the well-mixed reactor, fixed-bed reactor can achieve excellent treatment performance via using a small amount of adsorbent at a small reactor volume. However, the fixed-bed reactor has a small treatment capacity and requires high particle size of adsorbent. Too small adsorbent increases the water pressure of the bed, which is easy to cause short flow. When the completely static adsorbent is used to treat actual wastewater, it is easy to breed biofilm, causing bed blockage and affecting the stable and efficient operation of the adsorption process. However, increasing the particle size of adsorbent will greatly reduce the specific surface area and the effective content of active substances, which will affect the overall adsorption performance. The forming process of adsorbent is often complicated and costly.

Fluidized bed reactor has many advantages, such as large processing capacity, good mixing effect, not easy to cause short flow and blockage, etc. However, fluidized bed adsorption process is common in chemical unit operations such as gas catalysis and rarely reported in wastewater treatment. Meanwhile, fluidized bed adsorption has the problem of adsorbent loss to be solved. For example, Chinese utility model patent CN209098450U provides a special system for treating chemical wastewater by adsorption and dephenolization of liquid-solid double beds, which is equipped with a solid-liquid separation system after the fluidized bed adsorption system to solve the problem of adsorbent loss. Similarly, the Chinese invention patent CN105948321B discloses a device and method for treating industrial wastewater by fluidized bed adsorption-oxidation, which uses a sedimentation tank and a filter to intercept the adsorbent. The way of external solid-liquid separation facilities inevitably prolongs the treatment process, increases the area needed and increases the operation and maintenance cost of the treatment system.

To sum up, the two existing adsorption reactors cannot efficiently and stably use small particle size adsorption materials with high adsorption performance. Up to now, there is little research on the design and operation method of fluidized adsorption device in the field of sewage treatment.

SUMMARY OF THE INVENTION

Aiming at the use of the small size adsorbent and solving its loss problem, the invention provides a fluidized adsorption device and a fluidized adsorption method for sewage treatment. Through this device and method, small size adsorbents can be efficiently and stably used.

In the first aspect, the invention provides a fluidized adsorption device for sewage treatment, which comprises a fluidized adsorption column and a reflux device, wherein the fluidized adsorption column is sequentially provided with a water outlet area, a fluidized adsorption area and a water inlet area from top to bottom; the top end of the water inlet area is connected with the fluidized adsorption area through a water distribution plate, and the top end of the fluidized adsorption area is connected with the water outlet area through a filter component; the reflux device comprises a top reflux port, a middle reflux port, a bottom reflux port and a reflux tube connected with the three reflux ports, wherein the top reflux port is arranged in the water outlet area, the middle reflux port is arranged in the fluidized adsorption area, and the bottom reflux port is arranged in the water inlet area, and the top reflux port and the bottom reflux port are enabled during adsorption, and the middle reflux port and the bottom reflux port are enabled during adsorbent replacement, so that the fluidized adsorption column can run continuously.

The fluidized adsorption device of the invention realizes the good fluidized adsorption application of the small size adsorbent through the fluidized adsorption column, avoids many shortcomings of using the small size adsorbent in the fixed bed, and improves the adsorption performance; meanwhile, the filter component and the water distribution plate are used to intercept the adsorbent, and the fluidization adsorption device can keep running continuously when the adsorbent is replaced through the switching of the reflux mode, thus improving the processing capacity.

Optionally, the bottom of the water inlet area is provided with a water inlet, and the water outlet area is provided with a water outlet, and the water outlet is located above the top reflux port. Sewage enters from the bottom of the water inlet area, and after being adsorbed in the fluidized adsorption area, the sewage is discharged from the water outlet of the water outlet area to complete the adsorption treatment.

Optionally, the fluidized adsorption area is provided with a feed port and a discharge port, wherein the feed port is located above the discharge port, and the feed rate and discharge rate of the adsorbent are controlled by valves respectively. Preferably, the discharge port is located at the bottom of the fluidized adsorption area and above the water distribution plate, which is beneficial to discharge the adsorbent as much as possible and reduce the residue.

Optionally, the surface of the water distribution plate is uniformly provided with through holes, and the diameter of the through holes is smaller than the particle diameter of the adsorbent, so as to prevent the adsorbent from falling into the water inlet area, and at the same time, the water is uniformly distributed in the radial direction of the fluidized adsorption column after passing through the water distribution plate and uniformly passes through the fluidized adsorption area.

Optionally, the filter component is a movable filter screen, the mesh diameter of the movable filter screen is smaller than the particle diameter of the adsorbent, and the adsorbent is intercepted under the movable filter screen during fluidization movement, that is, intercepted in the fluidized adsorption area, and will not be lost from the water outlet along with the water body.

Preferably, a driving rod is installed on the upper surface of the movable filter screen, and is connected with a driving device outside the fluidized adsorption column through the driving rod, and the driving rod drives the movable filter screen to move up and down inside the fluidized adsorption column to adjust the height of the fluidized adsorption area in real time. The filter component of the invention can not only prevent the loss of adsorbent, but also be designed movably, and can adjust the volume of fluidized adsorption area in real time according to the magnitude of sewage inflow load or fluctuation of inflow situation during operation, change the fluidization state of adsorbent and the contact state between sewage and adsorbent, meet the adsorption requirements under different working conditions, and ensure stable operation and effluent quality.

Optionally, the height ratio of the water inlet area, the fluidized adsorption area and the water outlet area is 1:(3-5):(0.8-1); the height-diameter ratio of the fluidized adsorption area is (3.5-5):1; the axial cross section of the water inlet area is tapered, and the inner angle of the taper is 40°-60°.

Optionally, a diversion-flushing component is arranged below the filter component, and the diversion-flushing component comprises a flushing tube and a draft tube; the bottom of the flushing tube is communicated with the draft tube; the flushing tube is cylindrical; the draft tube is in the shape of a bell mouth, and the included angle between the bottom opening and the horizontal plane is 30°-45°. In order to solve the problem of adhesion of small particle adsorbent on the filter component, the invention provides the diversion-flushing component. On the one hand, the flow speed is increased after entering the draft tube, which can strongly and continuously flush the filter component above, thus avoiding the adhesion of adsorbent on the filter component; on the other hand, the adsorbent passing through the diversion-flushing component flows back to the fluidized adsorption area around again, forming a "core-annular" flow pattern, promoting the adsorbent to circulate in the fluidized adsorption area and improving the adsorption efficiency.

Optionally, the diversion-flushing component is fixedly connected with the filter component and moves up and down together with the filter component.

Optionally, the diversion-flushing component is movably connected with the filter component; the driving rod is in a sleeve mode; the outer tube is fixedly connected with the filter component, and the inner tube is fixedly connected with the diversion-flushing component. The distance between the diversion-flushing component and the filter component can be adjusted by the relative movement of the inner tube and the outer tube, so as to meet the different requirements for scouring intensity at different fluidization speeds.

Optionally, the tube diameter of the flushing tube is $1/10$-$1/4$ of the inner diameter of the fluidized adsorption area, and the radius of the bottom opening of the draft tube is $1/2$-$4/5$ of the radius of the fluidized adsorption area. Preferably, the tube diameter of the flushing tube is $1/10$-$1/5$ of the inner diameter of the fluidized adsorption area, and the radius of the bottom opening of the draft tube is $1/2$-$3/4$ of the radius of the fluidized adsorption area.

Optionally, the diversion-flushing component can also adopt the second form, wherein the flushing tube is cylindrical, and the draft tube is in the shape of semi-bell mouth, that is, half of the wall of the draft tube is parallel to the flushing tube and on the same straight line; the other half of the wall of the draft tube is in the shape of a bell mouth which is outwardly extending, and the included angle between the bell mouth and the horizontal plane is 30°-45°, and the lower edge of the draft tube is in the same plane. The second form of the flushing component is suitable for flushing the filter component near the wall area of the fluidized adsorption area. In application, the vertical side of the draft tube is close to the wall area of the fluidized adsorption area, and the bell mouth side of the draft tube faces the water flow area inside the fluidized adsorption area to flush the filter component near the wall area of the fluidized adsorption area.

Preferably, a number of semi-bell mouth diversion and flushing components are arranged near the wall along the circumferential direction of the fluidized adsorption area, and are fixedly connected with the diversion and flushing components of the first form through connecting rods to form a whole, and move together with the filter component, or move up and down relative to the filter component to adjust the relative distance between the diversion-flushing component and the filter component; or rotate relative to the filter component to adjust the position of the semi-bell mouth diversion-flushing component corresponding to flushing the edge of the filter component.

The second form of the diversion-flushing component described in the invention is used in combination with the first form, which not only can comprehensively flush the filter component, but also can form a double "core-annular" flow pattern between the two diversion and flushing components, which is conducive to the circulating flow of adsorbent and full contact with sewage, and improves the adsorption efficiency. Meanwhile, the two diversion-flushing components cooperate with each other, have various flushing modes and can be flexibly adjusted to achieve better flushing effect.

Optionally, the reflux device comprises a top reflux port, a middle reflux port, a bottom reflux port, a reflux tube and a reflux pump, wherein the top end of the reflux tube is connected with the top reflux port, the bottom end is connected with the bottom reflux port, and the middle reflux port is communicated with the reflux tube through a branch tube. The reflux pump is connected in the reflux tube, and is used for partially refluxing the feed liquid in the water outlet area or the fluidized adsorption area to the water inlet area, so as to provide the power required by the fluidization of the adsorbent.

Optionally, the reflux device further comprises an adsorbent reflux port which is communicated with the reflux tube through a branch tube, and the adsorbent reflux port is arranged at the lower part of the fluidized adsorption area; preferably, the adsorbent reflux port is arranged at the bottom of the fluidized adsorption area.

When the middle reflux port and adsorbent reflux port are activated, the reflux tube can reflux the feed liquid and adsorbent from the middle reflux port to the adsorbent reflux port together, and promote the circulation of adsorbent by external circulation.

The top reflux port, the middle reflux port, the bottom reflux port and the adsorbent reflux port are all provided with valves to control the opening, closing and flow of each reflux port.

The reflux device provided by the invention realizes different functions through setting reflux ports at different positions of the fluidized adsorption column. For example, the top reflux port is matched with the bottom reflux port to realize the reflux of feed liquid and provide the power required by the fluidization of adsorbent; the middle reflux port is matched with the bottom reflux port to ensure reflux and continuous operation when low liquid level occurs during adsorbent replacement; the middle reflux port is matched with the adsorbent reflux port to realize the external circulation of adsorbent. The application forms of the reflux device are flexible and diverse, and different requirements of the fluidized adsorption device can be met.

Optionally, the middle reflux port is provided with a switchable filter screen, and when the middle reflux port and the bottom reflux port are matched to replace the adsorbent, the filter screen is activated to filter the adsorbent, and only feed liquid is refluxed to the water inlet area; when the middle reflux port and adsorbent reflux port cooperate to circulate adsorbent, the filter screen is closed, and the feed liquid and adsorbent are refluxed to the bottom of the fluidized adsorption area.

Optionally, the height of the middle reflux port is ¼-¾ of the height of the fluidized adsorption area. Preferably, the height of the middle reflux port is ¼-½ of the height of the fluidized adsorption area.

In the second aspect, the invention also provides a fluidized adsorption method, which is completed by using the fluidized adsorption device, and comprises the following steps:

(1) injecting an adsorbent into a fluidized adsorption area through the feed port until the static stacking volume of the adsorbent accounts for 10%-90% of the fluidized adsorption area; meanwhile, injecting clean water until the liquid level reaches the top reflux port;

(2) starting the reflux pump, the top reflux port and the bottom reflux port, refluxing clean water, and starting the fluidized adsorption column;

(3) pumping sewage from the water inlet to the fluidized adsorption column, and the sewage flows out from the water outlet as produced water after the sewage is adsorbed in the fluidized adsorption area; meanwhile, sewage flushes the filter component through the diversion-flushing component to prevent the adsorbent from adhering;

(4) when the pollutant concentration is higher than the set target value or effluent discharge standard, replace the adsorbent, close the top reflux port and switch to the middle reflux port, discharge the adsorbent saturated with adsorption through the discharge port, close the discharge port when the liquid level drops to the middle reflux port, and replenish the adsorbent through the feed port;

(5) when the liquid level reaches the top reflux port again, close the middle reflux port and switch to the top reflux port again.

Optionally, the adsorbent is a powdered adsorbent or a granular adsorbent with a particle diameter of 50 μm-2 mm.

Preferably, the static stacking volume of the adsorbent in step (1) accounts for 10%-40% of the fluidized adsorption area.

Optionally, the step (2) specifically includes: turning on the reflux pump, adjusting the valves of the top reflux port and the bottom reflux port, controlling the ascending flow rate of the fluidized adsorption area, and controlling the ascending flow rate u(mm/s) to be 1.5-20 times of the initial fluidization speed of the adsorbent; the initial fluidization speed can be calculated by the following formula:

$$u_{p-mf} = \frac{Re_{p-mf}\mu_l}{\rho_l d_p}$$

where, $\mu_l$ and $\rho_l$ are the viscosity (Pa·s) and density (kg/m$^3$) of water respectively, $d_p$ is the average particle size (m) of adsorbent, and $R_{ep-mf}$ is critical Reynolds number of adsorbent, which can be calculated by the following formula:

$$Re_{p\_mf} = (25.28^2 + 0.0571 Ar_p)^{0.5} - 25.28$$

where $A_{rp}$ is Archimedes number of adsorbent:

$$Ar_p = \frac{\rho_l d_p^3 (\rho_s - \rho_l) g}{\mu_l^2}$$

where $\rho_s$ is the density of adsorbent (kg/m$^3$) and g is the gravitational acceleration.

Optionally, in step (3), the distance (D, mm) between the lower surface of the filter component and the top of the diversion-flushing component can be calculated by the following formula:

$$D = \frac{n \times u^2}{5 \times d'_p}$$

In the formula, n is the multiple of the ascending flow rate u relative to the initial fluidization speed of the adsorbent, and $d'_p$ is the average particle size (mm) of the adsorbent. In practical application, the n corresponding to small particle adsorbent is larger, while the n corresponding to large particle adsorbent is smaller.

The fluidized adsorption device and the fluidized adsorption method for sewage treatment are suitable for removing various pollutants, such as phosphate, fluoride ion, copper ion, zinc ion, lead ion, chromium ion, cadmium ion, nickel ion and the like.

BRIEF DESCRIPTION OF THE DRAWINGS

In the attached drawing, 1—Water inlet area; 2—Fluidized adsorption area; 3—Water outlet area; 4—Water distribution plate; 5—First diversion-flushing component; 501—First flushing tube; 502—First draft tube; 6—Movable filter screen; 7—Reflux tube; 8—Reflux pump; 9—Water inlet; 10—Water outlet; 11—Feed port; 12—Discharge port; 13—Top reflux port; 14—Central reflux port; 15—Bottom reflux port; 16—Second diversion-flushing component; 101—Second flushing tube; 102—Second draft tube; 17—Adsorbent reflux port.

DETAILED DESCRIPTION OF THE PREFERRED EMBODIMENTS

Embodiment 1

Figure 1:
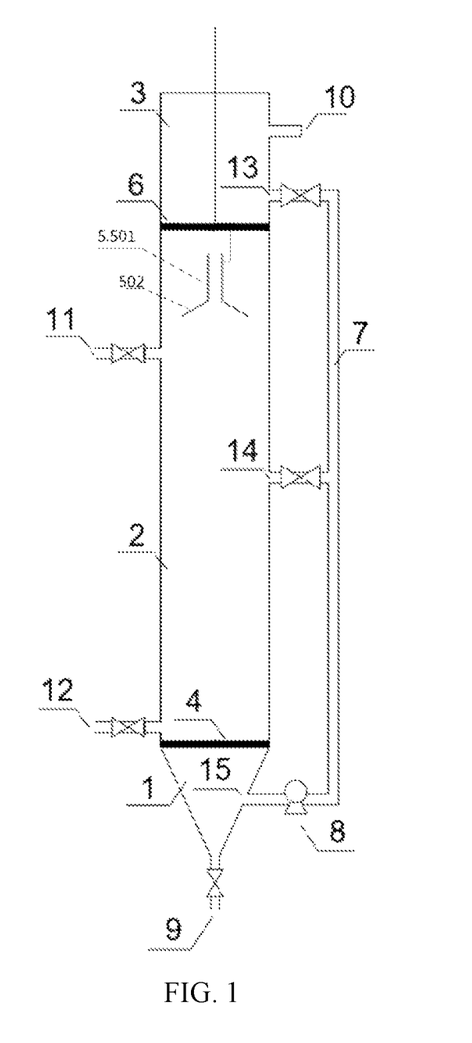
FIG. 1 is a schematic structural diagram of the fluidized adsorption device of Embodiment 1.

The fluidized adsorption device for sewage treatment in this embodiment, as shown in FIG. 1, comprises a fluidized adsorption column and a reflux device. The fluidized adsorption column is sequentially provided with a water outlet area 3, a fluidized adsorption area 2 and a water inlet area 1 from top to bottom, and the top of the water inlet area 1 is connected with the fluidized adsorption area 2 through a water distribution plate 4. The top end of that fluidize adsorption area 2 is connected with the water outlet area 3 through a filter component; the reflux device comprises a top reflux port 13, a middle reflux port 14, a bottom reflux port 15 and a reflux tube 7 connecting the three reflux ports. The top reflux port 13 is located in the water outlet area 3, the middle reflux port 14 is located in the fluidized adsorption area 2, and the bottom reflux port 15 is located in the water inlet area 1. The top reflux port 13 and the bottom reflux port 15 are activated during adsorption, and the middle reflux port 14 and the bottom reflux port 15 are activated during adsorbent replacement, so that the fluidized adsorption column can run continuously.

The bottom of the water inlet area 1 is provided with a water inlet 9, the water outlet area 3 is provided with a water outlet 10, and the water outlet 10 is located above the top reflux port 13. Sewage enters from the bottom of the water inlet area, and after being adsorbed in the fluidized adsorption area, the sewage is discharged from the water outlet of the water outlet area to complete the adsorption treatment.

The fluidized adsorption area 2 is provided with a feed port 11 and a discharge port 12. The discharge port 12 is located at the bottom of the fluidized adsorption area 2 and above the water distribution plate 4, which is beneficial to discharge the adsorbent as much as possible and reduce residues. The feed port 11 is located above the discharge port 12, and the feed rate and discharge rate of the adsorbent are controlled by valves respectively.

The surface of the water distribution plate 4 is uniformly provided with through holes, and the diameter of the through holes is smaller than the particle diameter of the adsorbent, so that the adsorbent can be prevented from falling into the water inlet area 1, and at the same time, the water is uniformly distributed in the radial direction of the fluidized adsorption column after passing through the water distribution plate 4 and uniformly passes through the fluidized adsorption area 2.

The filter component is a movable filter screen 6, the mesh diameter of the movable filter screen 6 is smaller than the particle diameter of the adsorbent, and the adsorbent is intercepted under the movable filter screen 6 during fluidization movement, that is, intercepted in the fluidized adsorption area 2, and will not be lost from the water outlet 10 along with the water body.

A driving rod is installed on the upper surface of the movable filter screen 6, which is connected with a driving device outside the fluidized adsorption column through the driving rod. The driving rod drives the movable filter screen 6 to move up and down inside the fluidized adsorption column to adjust the height of the fluidized adsorption area 2 in real time, adjust the volume of the fluidized adsorption area in real time according to the magnitude of the sewage inflow load or the fluctuation of the inflow situation during operation, change the fluidization state of the adsorbent and the contact state between sewage and adsorbent, meet the adsorption requirements under different working conditions, and ensure stable operation and effluent quality.

For example, the height ratio of water inlet area 1, fluidized adsorption area 2 and water outlet area 3 is 1:5:1, and the height-diameter ratio of fluidized adsorption area 2 is 3.5:1. The axial cross section of water inlet area 1 is tapered, and the inner angle of the taper is 60°.

A first diversion-flushing component 5 is arranged below the movable filter screen 6, and the first diversion-flushing component 5 comprises a first flushing tube 501 and a first draft tube 502; the bottom of the first flushing tube 501 is communicated with the first draft tube 502. The first flushing tube 501 is cylindrical, the first draft tube 502 is in the shape of a bell mouth, and the angle between the bottom opening and the horizontal plane is 45°. The diameter of the first flushing tube 501 is ⅕ of that of the fluidized adsorption area 2, and the radius of the bottom opening of the first draft tube 502 is ¾ of that of the fluidized adsorption area 2. The first diversion-flushing component 5 is fixedly connected with the movable filter screen 6 and moves up and down together with the movable filter screen 6.

The reflux device comprises a top reflux port 13, a middle reflux port 14, a bottom reflux port 15, a reflux tube 7 and a reflux pump 8. The top end of the reflux tube 7 is connected with the top reflux port 13; the bottom end is connected with the bottom reflux port 15; the middle reflux port 14 is connected with the reflux tube 7 through a branch tube, and the reflux pump 8 is connected with the reflux tube 7, which is used to reflux part of the feed liquid in the water outlet area 3 or the fluidized adsorption area 2 to the water inlet area 1, so as to provide the power required by the fluidization of the adsorbent. The height of the middle reflux port 14 is ¼ of the height of the fluidized adsorption area 2.

The top reflux port 13 and the middle reflux port 14 are provided with valves to control the opening, closing and flow of each reflux port.

Embodiment 2

According to the fluidized adsorption device for sewage treatment in this embodiment, the diameter of the first flushing tube 501 is 1/10 of that of the fluidized adsorption area 2, and the radius of the bottom opening of the first draft tube 502 is ½ of that of the fluidized adsorption area 2.

Other structures of the fluidized adsorption device for sewage treatment in this embodiment are the same as those in Embodiment 1.

Embodiment 3

According to the fluidized adsorption device for sewage treatment in this embodiment, the diameter of the first flushing tube 501 is ¼ of that of the fluidized adsorption area 2, and the radius of the bottom opening of the first draft tube 502 is ⅘ of that of the fluidized adsorption area 2.

Other structures of the fluidized adsorption device for sewage treatment in this embodiment are the same as those in Embodiment 1.

Embodiment 4

According to the fluidized adsorption device for sewage treatment in this embodiment, the height of the middle reflux port is ½ of the height of the fluidized adsorption area.

Other structures of the fluidized adsorption device for sewage treatment in this embodiment are the same as those in Embodiment 1.

Embodiment 5

According to the fluidized adsorption device for sewage treatment in this embodiment, the height of the middle reflux port is ¾ of the height of the fluidized adsorption area.

Other structures of the fluidized adsorption device for sewage treatment in this embodiment are the same as those in Embodiment 1.

Embodiment 6

According to the fluidized adsorption device for sewage treatment in this embodiment, the heights of water inlet area 1, fluidized adsorption area 2 and water outlet area 3 are 0.33 m, 1 m and 0.267 m respectively, and the height ratio of water inlet area 1, fluidized adsorption area 2 and water outlet area 3 is 1:3:0.8; the inner diameter of fluidized adsorption area 2 is 0.2 m, and the height-diameter ratio of fluidized adsorption area 2 is 5:1; the axial cross section of water inlet area 1 is tapered, and the inner angle of the taper is 40°. The first draft tube 502 has a bell mouth shape, and the angle between the bottom opening and the horizontal plane is 30°.

Other structures of the fluidized adsorption device for sewage treatment in this embodiment are the same as those in Embodiment 1.

Embodiment 7

Figure 2:
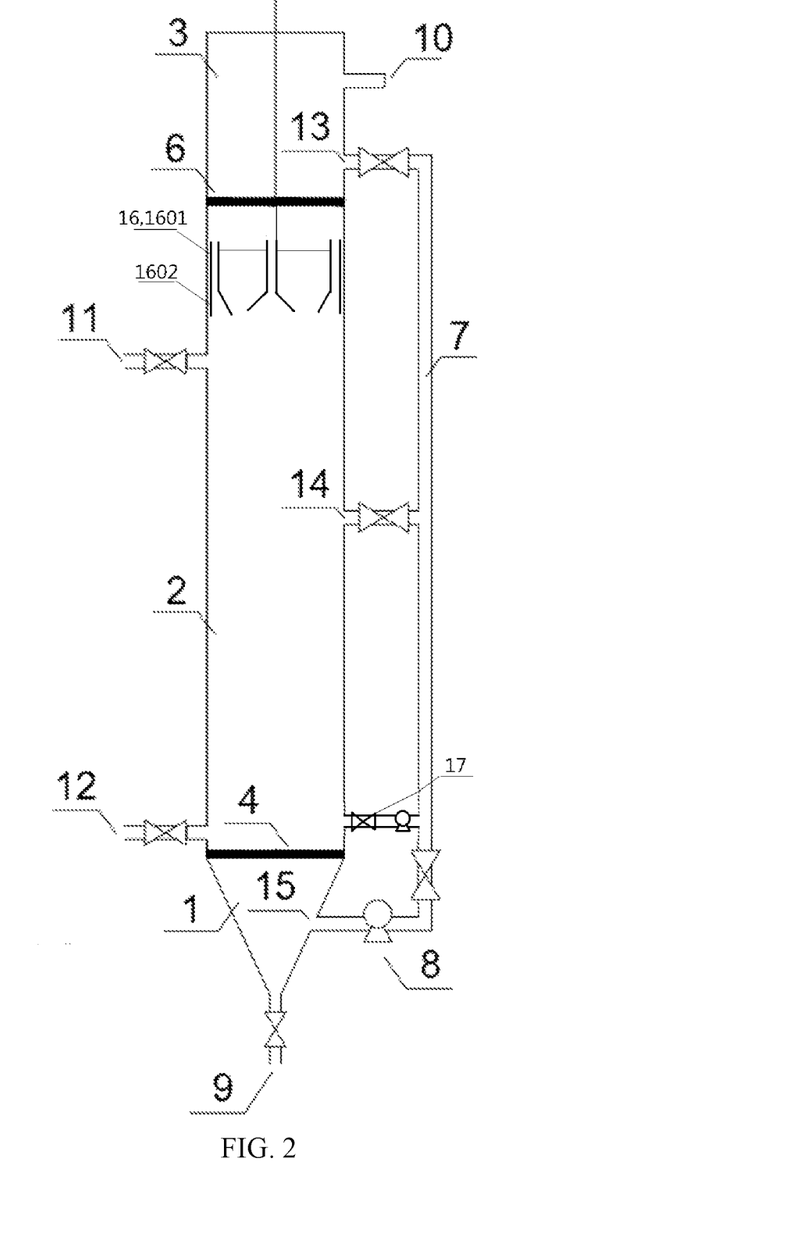
FIG. 2 is a schematic structural diagram of the fluidized adsorption device of Embodiment 7.

As shown in FIG. 2, about the fluidized adsorption device for sewage treatment in this embodiment, the first diversion-flushing component 5 is movably connected with the movable filter screen 6; the driving rod is in sleeve mode, the outer tube is fixedly connected with the movable filter screen 6, and the inner tube is fixedly connected with the first diversion-flushing component 5; through the relative movement of the inner tube and the outer tube, the adjustment of the distance between the first diversion-flushing component 5 and the movable filter screen 6 can be realized to meet the different requirements of flushing intensity at different fluidization speeds. The diameter of the first flushing tube 501 is ⅕ of that of the fluidized adsorption area 2, and the radius of the bottom opening of the first draft tube 502 is ¾ of that of the fluidized adsorption area 2.

In this embodiment, the second diversion-flushing component 16 is provided, the second flushing tube 1601 is cylindrical, and the second draft tube 1602 is in the shape of semi-bell mouth, that is, half of the wall of the second draft tube 1602 is parallel to the second flushing tube 1601 and on the same straight line, and the other half of the wall is in the shape of a bell mouth which is outwardly extending, the angle between the bell and the horizontal plane is 45°, and the lower edge of the second draft tube 1602 and the second flushing tube 1601 are in the same plane. When in use, the vertical side of the second draft tube 1602 is close to the wall of the fluidized adsorption area 2, and the horn opening side of the second draft tube 1602 faces the water flow area inside the fluidized adsorption area 2, so as to flush the movable filter screen 6 near the wall area of the fluidized adsorption area 2.

Six second diversion-flushing components 16 are arranged near the wall along the circumferential direction of the fluidized adsorption area, and are fixedly connected with the first diversion-flushing components 15 through connecting rods to form a whole. Together with the first diversion-flushing component 15, the second diversion-flushing component 16 moves up and down relative to the movable filter screen 6 through the sleeve driving rod to adjust the relative distance between the diversion-flushing component and the movable filter screen 6, and can also rotate relative to the movable filter screen 6 to adjust the position of the second diversion-flushing component 16 corresponding to flushing the edge of the movable filter screen 6.

The reflux device of this embodiment also includes an adsorbent reflux port 17 which is connected to the reflux tube 7 through a branch tube, and the adsorbent reflux port 17 is arranged at the bottom of the fluidized adsorption area. The height of the middle reflux port 14 is ¼ of the height of the fluidized adsorption area 2.

When the middle reflux port 14 and the adsorbent reflux port 17 are activated, the reflux tube 7 can reflux the feed liquid and adsorbent together from the middle reflux port 14 to the adsorbent reflux port 17, and promote the circulation of adsorbent by external circulation.

The middle reflux port 14 is provided with a switchable filter screen (not shown). When the middle reflux port 14 and the bottom reflux port 15 cooperate to replace the adsorbent, the filter screen is activated to filter the adsorbent, and only the feed liquid is refluxed to the water inlet area 1. When the middle reflux port 14 is matched with the adsorbent reflux port 17, the filter screen is closed, and the reflux tube 7 can reflux the feed liquid and adsorbent together from the middle reflux port 14 to the adsorbent reflux port 17, and send the feed liquid to the bottom of the fluidized adsorption area 2 to promote the circulation of adsorbent by external circulation.

Other structures of the fluidized adsorption device for sewage treatment in this embodiment are the same as those in Embodiment 1.

Embodiment 8

The fluidization adsorption device for sewage treatment in this embodiment is not provided with diversion-flushing components, and other structures are the same as those in Embodiment 1.

Embodiment 9

The fluidized adsorption device for sewage treatment in this embodiment does not have an adsorbent reflux port, and other structures are the same as those in Embodiment 1.

Embodiment 10

The fluidized adsorption method provided by this embodiment uses the fluidized adsorption device of Embodiment 1 to treat the deep dephosphorization of biochemical effluent from municipal sewage plant, and includes the following steps:
- (1) injecting dephosphorization adsorbent with average particle size of 50 μm into fluidized adsorption area 2 through feed port 11 until the static stacking volume of adsorbent accounts for 10% of fluidized adsorption area 2; meanwhile, clean water is injected until the liquid level reaches the top reflux port 13;
- (2) starting the reflux pump 8, adjusting the valves of the top reflux port 13 and the bottom reflux port 15, refluxing clean water, controlling the ascending flow rate of the fluidized adsorption area 2 to be 20 times of the initial fluidization speed of the adsorbent, and starting the fluidized adsorption column; the initial fluidization speed of adsorbent is 0.069 mm/s, and the ascending flow rate is 1.38 mm/s;

(3) pumping sewage from the water inlet 9 to the fluidized adsorption column, the sewage is absorbed in the fluidized adsorption area and then flows out from the water outlet 10 as produced water; meanwhile, sewage flushes the movable filter screen 6 through the first diversion-flushing component 5 and the second diversion-flushing component 16 to prevent the adsorbent from adhering;

(4) when the phosphate concentration sampled at the water outlet 10 is higher than 0.5 mg/L, replace the adsorbent, close the top reflux port 13, switch to the middle reflux port 14, discharge the adsorbent saturated with adsorption through the discharge port 12, close the discharge port 12 when the liquid level drops to the middle reflux port 14, and replenish the adsorbent through the feed port 11;

(5) when the liquid level reaches the top reflux port 13 again, close the middle reflux port 14, switch to the top reflux port 13 again, and continue the adsorption treatment;

(6) repeating steps (1)-(5) until the sewage treatment is finished.

In step (3), the distance (D, mm) between the lower surface of the filter component and the top of the diversion-flushing component is calculated by the following formula:

$$D = \frac{n \times u^2}{5 \times d'_p} = \frac{20 \times 1.38^2}{5 \times 0.05} = 152 \text{ (mm)}$$

Embodiment 11

The fluidized adsorption method provided by this embodiment is the same as that of Embodiment 10, and the fluidized adsorption device of Embodiment 2 is used.

Embodiment 12

The fluidized adsorption method provided by this embodiment is the same as that of Embodiment 10, and the fluidized adsorption device of Embodiment 3 is used.

Embodiment 13

The fluidized adsorption method provided by this embodiment is the same as that of Embodiment 10, and the fluidized adsorption device of Embodiment 4 is used.

Embodiment 14

The fluidized adsorption method provided by this embodiment is the same as that of Embodiment 10, and the fluidized adsorption device of Embodiment 5 is used.

Embodiment 15

The fluidized adsorption method provided by this embodiment is the same as that of Embodiment 10, and the fluidized adsorption device of Embodiment 6 is used.

Embodiment 16

The fluidized adsorption method provided by this embodiment is the same as that of Embodiment 10, and the fluidized adsorption device of Embodiment 7 is used.

Embodiment 17

The fluidized adsorption method provided by this embodiment is the same as that of Embodiment 10, and the fluidized adsorption device of Embodiment 8 is used.

Embodiment 18

The fluidized adsorption method provided by this embodiment is the same as that of Embodiment 10, and the fluidized adsorption device of Embodiment 9 is used.

Comparative Example 1

The fluidized adsorption method provided by this comparative example is the same as that of Embodiment 10. The fluidized adsorption device for sewage treatment of this comparative example is not provided with a reflux device, and other structures are the same as those of Embodiment 1.

Embodiment 19

The fluidized adsorption method provided by this embodiment uses the fluidized adsorption device of Embodiment 7 for deep fluorine removal in fluorination plants, and includes the following steps:

(1) injecting dephosphorization adsorbent with an average particle size of 2 mm into fluidized adsorption area 2 through feed port 11 until the static stacking volume of adsorbent accounts for 40% of fluidized adsorption area 2; meanwhile, clean water is injected until the liquid level reaches the top reflux port 13;

(2) starting the reflux pump 8, adjust the valves of the top reflux port 13 and the bottom reflux port 15, reflux clean water, controlling the ascending flow rate of the fluidized adsorption area 2 to be 1.5 times of the initial fluidization speed of the adsorbent used, and starting the fluidized adsorption column; the initial fluidization speed of adsorbent is 14.22 mm/s, and the ascending flow rate is 21.33 mm/s;

(3) pumping sewage from the water inlet 9 to the fluidized adsorption column, the sewage is absorbed in the fluidized adsorption area and then flows out from the water outlet 10 as produced water; meanwhile, sewage flushes the movable filter screen 6 through the first diversion-flushing component 5 and the second diversion-flushing component 16 to prevent the adsorbent from adhering;

(4) when the fluoride concentration sampled at the water outlet 10 is higher than 6 mg/L, replace the adsorbent, close the top reflux port 13, switch to the middle reflux port 14, discharge the adsorbent saturated with adsorption through the discharge port 12, close the discharge port 12 when the liquid level drops to the middle reflux port 14, and replenish the adsorbent through the feed port 11;

(5) when the liquid level reaches the top reflux port 13 again, close the middle reflux port 14, switch to the top reflux port 13 again, and continue the adsorption treatment;

(6) repeating steps (1)-(5) until the sewage treatment is finished.

In step (3), the distance (D, mm) between the lower surface of the filter component and the top of the diversion-flushing component is calculated by the following formula:

$$D = \frac{n \times u^2}{5 \times d'_p} = \frac{15 \times 21.33^2}{5 \times 2} = 68 \text{ (mm)}$$

TABLE 1

Sewage Treatment Effect of Embodiments 10-19

| | Effluent pollutant concentration (mg/L) |
|---|---|
| Embodiment 10 | 0.38 |
| Embodiment 11 | 0.39 |
| Embodiment 12 | 0.43 |
| Embodiment 13 | 0.36 |
| Embodiment 14 | 0.44 |
| Embodiment 15 | 0.37 |
| Embodiment 16 | 0.26 |
| Embodiment 17 | 0.48 |
| Embodiment 18 | 0.47 |
| Embodiment 19 | 4.2 (fluoride) |
| Comparative example 1 | 3.5 |

Note:
The wastewater treated in Embodiment 19 is fluorine-containing wastewater.

From the above table, it can be seen that the fluidized adsorption device and fluidized adsorption method provided by the invention can achieve good treatment effect. In Embodiment 10-18, when phosphorus-containing wastewater is treated, the phosphate removal rate is stable above 99%, and the concentration of phosphorus and phosphate in effluent is stable below the first-class A standard limit of "*Discharge Standard for Urban Sewage Treatment Plants (GB 18918-2002)*" of 0.5 mg/L. In Embodiment 19, the fluoride removal rate of fluorine-containing wastewater is more than 99%, and the fluoride concentration in effluent is lower than the emission limit of 6.0 mg/L in "*Emission Standard of Pollutants for Inorganic Chemical Industry (GB 31573-2015)*".

What is claimed is:

1. A fluidized adsorption device for sewage treatment, comprising a fluidized adsorption column and a reflux device, wherein the fluidized adsorption column consists of a water outlet area, a fluidized adsorption area, and a water inlet area from top to bottom; a top end of the water inlet area is connected with the fluidized adsorption area through a water distribution plate, and a top end of the fluidized adsorption area is connected with the water outlet area through a filter component;

the reflux device comprises a top reflux port, a middle reflux port, a bottom reflux port and a reflux tube connected with the three reflux ports; the top reflux port is located in the water outlet area, the middle reflux port is located in the fluidized adsorption area, and the bottom reflux port is located in the water inlet area; the top reflux port and the bottom reflux port are activated during adsorption, and the middle reflux port and the bottom reflux port are activated during adsorbent replacement, so that the fluidized adsorption column can run continuously;

wherein a diversion-flushing component is arranged below the filter component, and the diversion-flushing component comprises a flushing tube and a draft tube; a bottom of the flushing tube is communicated with the draft tube; the flushing tube is cylindrical, and the draft tube has a bell mouth shape;

a tube diameter of the flushing tube is ¹⁄₁₀-¼ of an inner diameter of the fluidized adsorption area, and a radius of a bottom opening of the draft tube is ½-⅘ of a radius of the fluidized adsorption area;

wherein the reflux device further comprises a reflux pump; a top end of the reflux tube is connected with the top reflux port; a bottom end of the reflux tube is connected with the bottom reflux port, and the middle reflux port is communicated with the reflux tube through a branch tube; the reflux pump is connected in the reflux tube, and is configured for partially refluxing feed liquid in the water outlet area or the fluidized adsorption area to the water inlet area, so as to provide power required by fluidization of an adsorbent.

2. The fluidized adsorption device according to claim 1, wherein the filter component is a movable filter screen, and a mesh diameter of the movable filter screen is smaller than a particle diameter of an adsorbent;

an upper surface of the movable filter screen is provided with a driving rod which is connected with a driving device outside the fluidized adsorption column, and the driving rod drives the movable filter screen to move up and down inside the fluidized adsorption column to adjust a height of the fluidized adsorption area in real time.

3. The fluidized adsorption device according to claim 2, wherein the diversion-flushing component is movably connected with the filter component; the driving rod is configured as a sleeve arrangement; an outer tube is fixedly connected with the filter component, and an inner tube is fixedly connected with the diversion-flushing component; through the relative movement of the inner tube and the outer tube, a distance between the diversion-flushing component and the filter component can be adjusted to meet different requirements for scouring intensity at different fluidization speeds.

4. The fluidized adsorption device according to claim 1, wherein the reflux device further comprises an adsorbent reflux port which is communicated with the reflux tube through a branch tube, and the adsorbent reflux port is arranged at a lower part of the fluidized adsorption area;

when the middle reflux port and the adsorbent reflux port are activated, the reflux tube can reflux the feed liquid and adsorbent from the middle reflux port to the adsorbent reflux port, and promote the circulation of adsorbent by external circulation.

5. The fluidized adsorption device according to claim 4, wherein a height of the middle reflux port is ¼-¾ of the height of the fluidized adsorption area;

the middle reflux port is provided with a switchable filter screen, and when the middle reflux port and the bottom reflux port are matched to replace the adsorbent, the switchable filter screen is activated to filter the adsorbent, and only feed liquid is refluxed to the water inlet area; when the middle reflux port and the adsorbent reflux port cooperate to circulate adsorbent, the filter screen is closed, and the feed liquid and adsorbent are refluxed to a bottom of the fluidized adsorption area.

6. The fluidized adsorption device according to claim 1, wherein a bottom of the water inlet area is provided with a water inlet, and the water outlet area is provided with a water outlet, which is located above the top reflux port;

the fluidized adsorption area is provided with a feed port and a discharge port, wherein the feed port is located above the discharge port, and the feed rate and the discharge rate of the adsorbent are controlled by valves;

a surface of the water distribution plate is uniformly provided with through holes, and an aperture of the through holes is smaller than a particle diameter of an adsorbent to prevent the adsorbent from falling into the water inlet area.

7. A fluidized adsorption method, wherein the fluidized adsorption method is completed by using the fluidized adsorption device of claim 1, which comprises the following steps:
(1) injecting an adsorbent into a fluidized adsorption area through the feed port until the static stacking volume of the adsorbent accounts for 10%-90% of the fluidized adsorption area; meanwhile, injecting clean water until the liquid level reaches the top reflux port;
(2) starting the reflux pump, the top reflux port and the bottom reflux port, refluxing clean water, and starting the fluidized adsorption column;
(3) pumping sewage from the water inlet to the fluidized adsorption column, and the sewage flows out from the water outlet as produced water after the sewage is adsorbed in the fluidized adsorption area; meanwhile, sewage flushes the filter component through the diversion-flushing component to prevent the adsorbent from adhering;
(4) when a pollutant concentration in the treated water is higher than a set target value or an effluent discharge standard, replace the adsorbent, close the top reflux port and switch to the middle reflux port, discharge the adsorbent saturated with adsorption through the discharge port, close the discharge port when the liquid level drops to the middle reflux port, and replenish the adsorbent through the feed port;
(5) when the liquid level reaches the top reflux port again, close the middle reflux port and switch to the top reflux port again.

* * * * *